April 12, 1938.  C. R. DUNCAN  2,113,830
AUTOMOBILE LOCK
Filed May 27, 1937
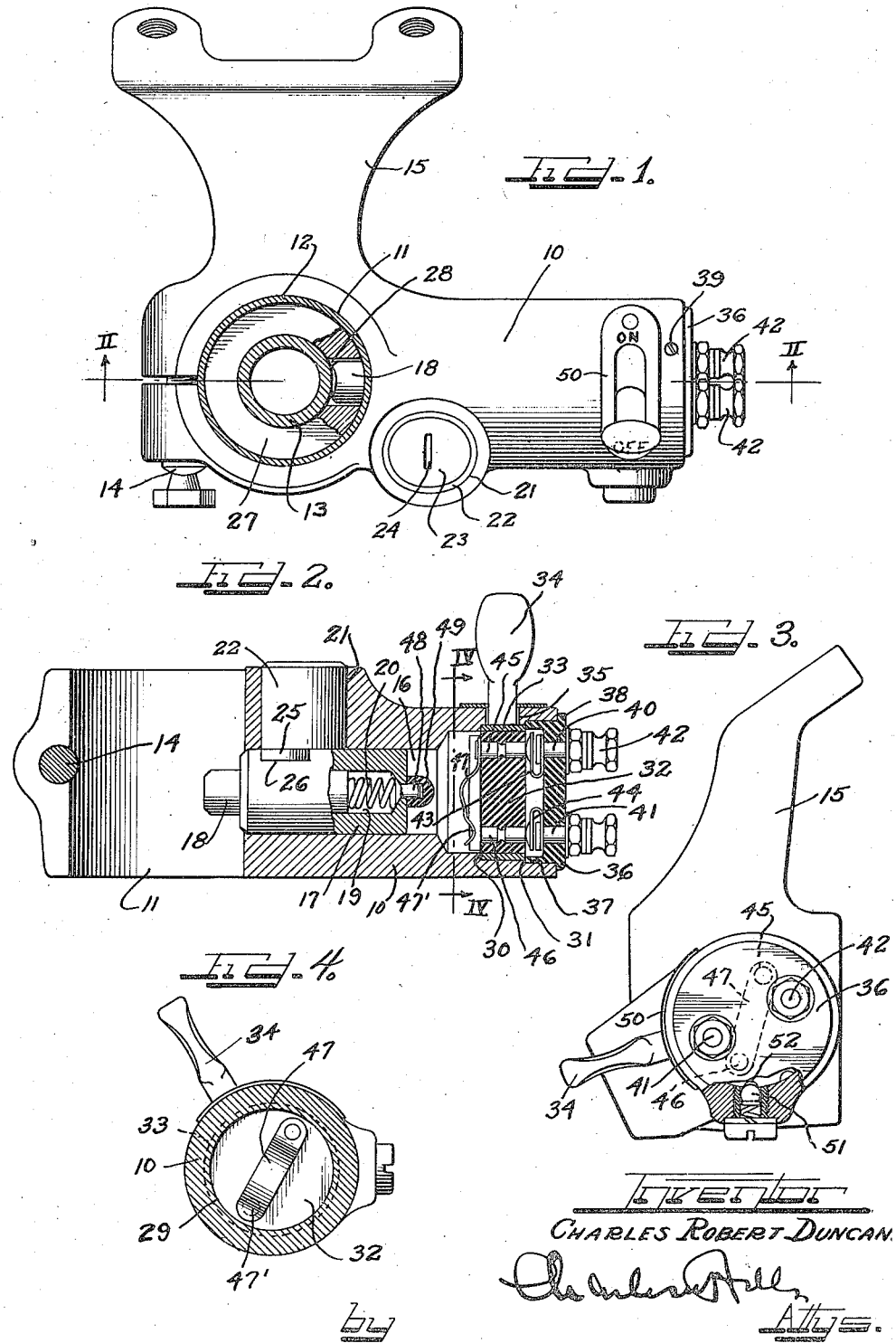
Inventor
CHARLES ROBERT DUNCAN Patented Apr. 12, 1938

2,113,830

UNITED STATES PATENT OFFICE 2,113,830

AUTOMOBILE LOCK

Charles Robert Duncan, Waukegan, Ill., assignor to Oakes Products Corporation, North Chicago, Ill., a corporation of Michigan Application May 27, 1937, Serial No. 145,003

5 Claims. (Cl. 200—55)

My invention relates to automobile locks, and particularly locks for controlling the locking of the steering and the ignition. The important object of the invention is to provide improved construction and arrangement in that type of lock in which the ignition circuit serially includes two switch assemblies, one of which is manually operable, and the other of which is controlled by the location of the steering lock bolt structure, the arrangement being such that when the lock bolt structure is in steering locking position the switch assembly controlled thereby will be open but will be closed when the lock bolt structure is in steering unlocking position so that operation of the manually controlled switch assembly may then be effective to close or open the ignition circuit.

The various features of the invention are incorporated in the structure shown on the drawing, in which drawing:

Figure 1 is a plan view of the lock structure applied to a steering column;

Figure 2 is a section on plane II—II of Figure 1;

Figure 3 is an end view of the structure shown in Figure 1; and

Figure 4 is a section on plane IV—IV of Figure 2.

The lock structure shown comprises the substantially cylindrical body or housing 10, the housing at one end having the cylindrical transverse passageway 11 for receiving a steering column 12 through which extends a steering shaft 13 terminating at its upper end in a steering wheel (not shown). To the left of the passage 11 the body is split so that the two halves surrounding the passageway may be contracted securely around the steering column by the force of a screw 14. A bracket 15 extends rearwardly from the lock body and is adapted to be secured to a support such as the instrument panel of the automobile.

To the right of the passageway 11, the lock body has the horizontally extending bore 16 for receiving the barrel 17 of the lock bolt structure, the lock bolt 18 being slidable with the bore 19 of the barrel 17 and is urged outwardly by a spring 20. A transverse bore 21 extends upwardly from the bore 16 to receive a lock casing 22 in which a lock cylinder 23 is rotatable by means of a proper key inserted in the key hole 24, the lock cylinder having a cam 25 at its lower end engaging in the recess 26 in the lock bolt barrel 17 so that when the cylinder is turned by the key the lock bolt structure will be shifted to steering locking or unlocking position in the bore 16. A bushing 27 is secured to the steering shaft 13 and has a radially extending lock notch or hole 28 for receiving the outer end of the lock bolt 18 so that operation of the steering wheel will be prevented.

At its outer end the bore 16 is of increased diameter to provide a switch chamber 29 and to provide intermediate and outer shoulders 30 and 31. The manually operable switch assembly comprises a cylindrical block 32 of insulating material secured within a metal ring 33 from which the operating handle 34 extends through elongated slot 35 in the body 10, the ring abutting the shoulder 30. Into the outer end of the chamber 29 is inserted the plug or cover 36 of insulating material, the cover having the internal annular flange 37 abutting the shoulder 31 and the outer end of the ring 33, and the cover having the outer flange 38 abutting the outer end of the body 10, securing means such as screws or pins 39 serving to hold the cover structure in position.

Extending through the cover are terminal pins or posts 40 and 41 carrying binding nuts 42 at their outer ends by which the terminals of a circuit, such as the ignition circuit, may be connected with the terminal posts. At their inner ends the terminal posts have clamped under their heads the resilient contact members or springs 43 and 44 which are shown as being of U-shape, the inner legs of the contact springs engaging the outer face of the switch block 32 to be insulated from or to be in contact with conductor pins 45 and 46 extending through the switch block, as the block is turned by means of the handle 34.

The switch assembly controlled by the lock bolt structure comprises a leaf spring 47 secured at one end to one of the conductor pins, as for example the pin 45, the spring extending diametrally across the inner side of the switch block 32 with its free end 47' in alignment with the other conductor pin 46, the spring intermediate its ends being arched outwardly as shown and the spring being normally flexed so that its free end 47' will be displaced from the conductor pin 46. The lock bolt structure barrel 17 has a lug 48 extending from its inner end, and the lug may be in the form of a pin seated in the lock bolt barrel at the axial point thereof. This lug or pin has a cap 49 of insulating material secured thereto which cap engages with the switch spring 47 when the lock bolt structure is shifted to steering unlocking position, so that the spring will be deflected to engage its free end 47' with the conductor pin 46 so as to complete the circuit between the conductor pins 45 and 46. When the ignition circuit is thus closed at this point by the spring 47, the circuit may be finally closed by rotation of the switch block 32 to engage the conductor pins with the contact springs 43 and 44 and with the ignition circuit terminals 40 and 41 for complete closure of the ignition circuit.

An escutcheon plate 50 may be secured to the lock body 10 in register with the slot 35 with legends thereon for indicating whether the ignition circuit is "on" or "off". Figures 1 and 3 show the ignition circuit "off" and the lock bolt in steering locking position. Figure 2 shows the lock bolt in steering locking position and with the switch blade 47 in open position but with the switch block 32 in "on" position with the conductor pins 45 and 46 in contact with the switch terminals. When the lock bolt is shifted to unlocking position, the switch blade 47 will be closed and the ignition circuit will then be fully closed but may be opened by rotation of the switch block 32 to "off" position. The switch block 32 may be yieldably held in either its "on" or "off" position as by means of a spring pressed ball 51 engaging in the stop notches 52 and 53 provided in the ring 33 which supports the switch block.

I thus provide a simple and efficient lock structure in which the locking bolt controls the continuity of the circuit through the switch assembly so that when the locking bolt is in locking position, the ignition circuit cannot be closed for service by operation of the manually controlled switch assembly, closure of the circuit for service being possible only when the locking bolt has been shifted to its unlocking position for movement of the switch spring 47 to closed position. In either position of the locking bolt, the manually operable switch assembly may be moved to "on" or "off" position, but only when the lock bolt structure is in unlocking position may the ignition circuit be closed for service. I do not desire to be limited to the exact construction and arrangement shown and described, as changes and modifications may be made without departing from the scope and spirit of the invention.

I claim as follows:

1. In a lock structure of the class described, a lock body, a lock bolt structure shiftable in said body to steering locking or unlocking position, circuit terminals extending into said body, a manually operable switch element having contacts for engagement with or disconnection from said circuit terminals, a switch spring connected with one of said switch element contacts but normally disconnected from the other contact, and means whereby shift of said bolt structure to steering unlocking position will engage said switch spring with said other contact for electrical connection of said contacts and whereby engagement of said contacts with said terminals by manipulation of the switch element will then close for service the circuit connected with said terminals.

2. In a lock structure of the class described, a lock body, a lock bolt structure shiftable in the inner end of said body to steering locking or unlocking position, stationary circuit terminals at the outer end of said body for connection with a circuit to be controlled, a switch block rotatable within said body between said lock bolt structure and said circuit terminals, contacts on said switch block for engagement at their outer ends with or disconnection from said terminals when said block is rotated, a switch spring on the inner side of said switch block secured at one end to one of said contacts but normally disconnected from the other contact, and means on said lock bolt structure for engagement with said switch spring for connection thereof with said other contact when said lock bolt structure is moved to steering unlocking position whereby the circuit will be closed for service when said contacts are in engagement with said terminals.

3. In a lock structure of the class described, a lock body, a lock bolt structure shiftable in the inner part of said body to steering locking or unlocking position, circuit terminals extending into the outer end of said body and adapted for connection at their outer ends with a circuit to be controlled, a cylindrical switch block rotatable in said housing between said terminals and the lock bolt structure, conductor pins extending in axial direction through said switch block for connection at their outer ends with said terminals when said switch block is rotated, a switch spring on the inner side of said switch block secured to one of said conductor pins but normally displaced from the other conductor pin, and means whereby shift of said lock bolt structure to steering unlocking position will engage said switch spring with said other conductor pin for completion of the circuit.

4. In a lock structure of the class described, a lock body having a bore therethrough, a lock bolt structure shiftable in the inner end of said bore to steering locking or unlocking position, a terminal plate closing the outer end of said bore and having terminals for connection with a circuit to be controlled, a cylindrical switch block in the outer end of said bore in axial alignment with said lock bolt structure, conductor pins extending through said switch block and said switch block being rotatable to engage said conductor pins at their outer ends with said terminals or to disconnect them therefrom for closing or opening of the circuit at that point, a switch spring on the inner side of said switch block extending diametrally thereof and secured at one end to one of said conductor pins but displaced at its other end from the other conductor pin when said lock bolt structure is in steering locking position, and means whereby shift of said lock bolt structure to steering unlocking position will flex said spring into engagement with said other conductor pin for closure at that point of the circuit whereafter said circuit may be then opened or closed by rotation of said switch block.

5. In a lock structure of the class described, a lock housing, a lock bolt structure shiftable in said housing to steering locking or unlocking position, circuit terminals on said housing for connection with a circuit to be controlled, a rotatable switch element within said housing between said terminals and said lock bolt structure, means for rotating said switch element, contacts on said switch element and a switch blade carried thereby for cooperating with said contacts, said switch blade being in position for disconnection of said contacts when said lock bolt structure is in locking position but being engaged by said lock bolt structure for connection of said contacts when said lock bolt structure is shifted to unlocking position, said contacts being arranged for connection with or disconnection from said terminals whereby when said lock bolt structure is in unlocking position said switch element may be moved for final closing or for opening of the circuit.

CHARLES ROBERT DUNCAN.